Figures 1, 2:
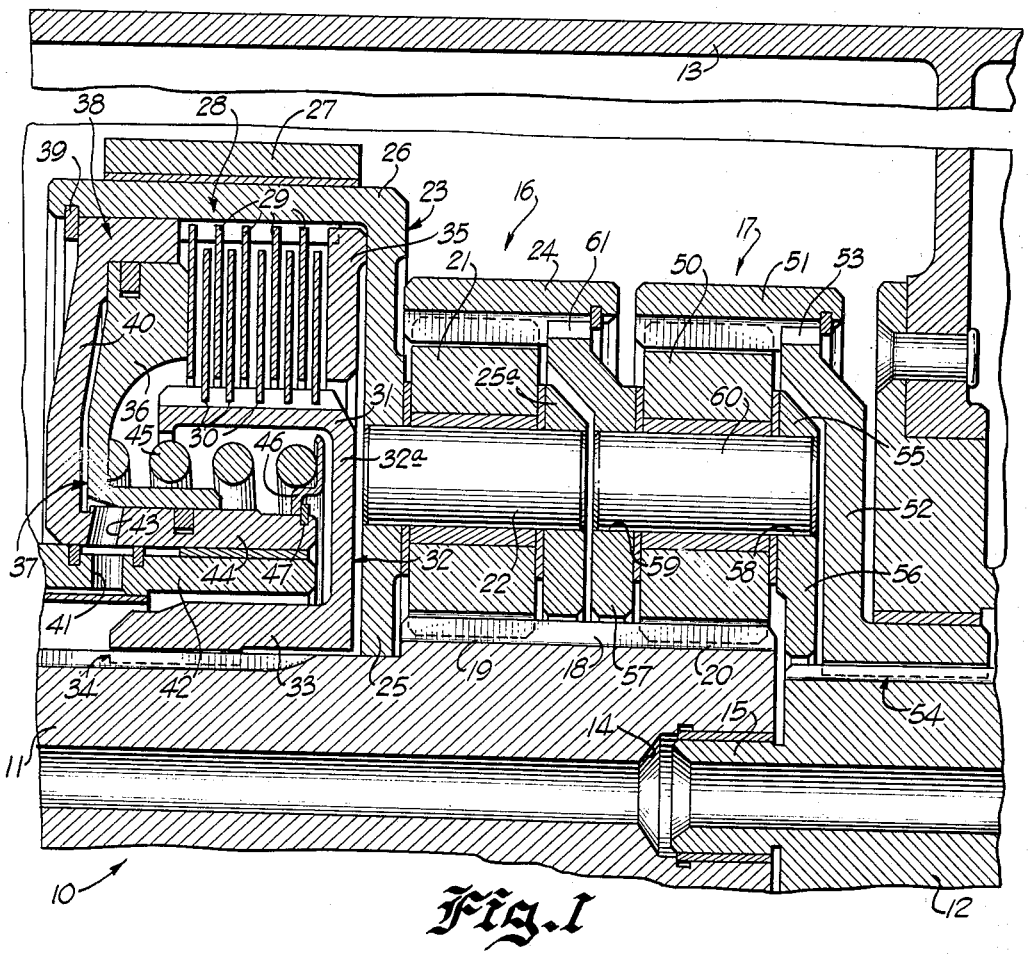

Nov. 15, 1960    J. A. MILLER    2,959,987
PLANETARY REVERSING MECHANISM
Filed Dec. 31, 1957

INVENTOR.
JAMES A. MILLER
BY
Kenneth C. Witt
ATTORNEY

United States Patent Office 2,959,987
Patented Nov. 15, 1960

2,959,987

PLANETARY REVERSING MECHANISM

James A. Miller, Battle Creek, Mich., assignor to Clark Equipment Company, a corporation of Michigan Filed Dec. 31, 1957, Ser. No. 706,413

3 Claims. (Cl. 74—792)

The present invention relates generally to planetary gearings for power transmissions and is more particularly concerned with a transmission of this type for use on a vehicle in order to provide power ratios which approach unity in both forward and reverse drives.

Although the transmission of the present invention may be used in a number of applications, for example, on highway, industrial and construction machine transmissions, it is particularly well suited for use on power driven carts or small trucks of the type which are operated about as frequently in reverse as they are in forward drive. One particular installation in which the transmission of this invention will find favor is in load carrying vehicles adapted to be moved from point to point in picking up and depositing its load. In vehicles of this nature it is desirable that the speed in reverse be approximately the same as the forward speed in order to permit convenient manipulation of the vehicle between the different points. Moreover, it is desirable that both the forward and reverse speeds be relatively high so that the time required for the vehicle to move from point to point is minimized. The gearing of the present invention is also well suited for use as a reversing unit either ahead of or behind a multiple speed transmission. Since both the forward and reverse speed ratios approach unity, the gear set may be turned end for end.

It is therefore a principal object of the present invention to provide a planetary gearing between input and output members wherein the reverse speed ratio approaches unity.

Another object of the invention is to provide a planetary gearing between input and output members wherein a direct drive forward ratio is effected which is substantially equal to the reverse ratio.

A further object of the present invention is to provide a transmission for accomplishing the foregoing objects but which is nevertheless compactly arranged and simply constructed with the construction being characterized by the use of a large number of identical parts which can be inexpensively produced by mass production techniques.

The foregoing and other objects are realized, in accordance with the present invention, by the use of a pair of simple planetary gear sets connected between an input member and an output member in such manner that one of the gear sets serves as a control set while the other gear set functions as a drive set for driving the output member. Each gear set comprises the usual sun and ring gears each meshing with a plurality of planet pinions rotatably supported upon a planet carrier. The sun gears of the two gear sets are connected together for joint rotation by the input member and the ring gear of the control set is joined to the planet carrier of the drive set. The ring gear of the drive set is connected to the output member in order to complete the drive train. Forward drive is obtained by locking together two of the elements of one of the gear sets so that these sets are locked in order to provide a direct or unity ratio drive from the input member to the output member. Reverse drive is accomplished by holding the planet carrier of the control set stationary to provide a dual path of power flow to the drive set, the first such path being through the drive set sun gear which rotates in the same direction and at the same speed as the input member and the second such path being from the ring gear of control set to the planet carrier of the drive set so that the latter carrier is driven in reverse direction and at reduced speed. The ring gear of the drive set thus rotates in reverse direction and the gear elements are so designed that the reverse ratio approaches unity.

The invention, both as to its organization and manner of operation together with further objects and advantages, will best be understood by reference to the following detailed description and claims taken in conjunction with the accompanying drawing wherein:

Fig. 1 is a fragmentary, side elevational view, partly in section illustrating a transmission characterized by the features of the present invention; and Fig. 2 is a schematic diagram of the transmission shown in Fig. 1.

Referring now to the drawing and particularly to Fig. 1, the planetary gearing of the present invention is there identified generally by reference numeral 10 and is employed to transmit drive from an input shaft or member 11 to an output shaft or member 12 coaxially arranged with respect to the input shaft. To facilitate the described alignment, the inner end of the shaft 11 is recessed as indicated at 14 to receive an axial extension 15 on the shaft 12. The gearing 10 is shown enclosed within a suitable casing or housing 13 having a first opening at one end for receiving the input shaft 11 and a second opening at the opposite end for accommodating the output shaft 12. Suitable bearings are provided in the housing for rotatably supporting each of the shafts. It should be understood that the gearing 10 could be used in cooperation with other gear sets located within the housing 13 to provide a complete drive train although these other gear sets have not been shown since they form no part of the present invention. The input shaft 11 may, therefore, be driven from a prior gear set in the drive train or may be driven from the engine shaft of the vehicle through a torque converter or fluid coupling. Similarly, the output shaft 12 may be connected to drive the vehicle wheels through one or more additional gear sets in the drive train.

In any event, the planetary gearing 10 consists of a control gear set 16 and a drive gear set 17 connected between the shafts 11 and 12. Each of the gear sets 16 and 17 is of the simple, planetary type. To supply drive to both of the gear sets 16 and 17 in unison, the input shaft 11 includes an enlarged diameter portion 18 which is externally toothed to provide a first sun gear 19 for the control gear set 16 and also to provide a second sun gear 20 for the drive gear set 17. Since the sun gears 19 and 20 are formed integral with the input shaft they are, of course, rotated in the same direction and at the same speed as the latter shaft. The sun gear 19 meshes with a plurality of equally spaced planet pinions 21 each of which is supported upon a stub shaft 22 carried by a planet carrier 23. The control gear set 16 also includes a ring gear 24 meshing with each of the planet pinions 21. The carrier 23 includes interconnected portions 25 and 25a extending along the opposed sides of the pinion 21 and provided with aligned openings for receiving the opposed ends of the shaft 22. An axially extending brake drum 26 formed integral with the carrier portion 25 is adapted to be engaged by a conventional friction type band brake 27 for the purpose of holding the planet carrier 23 of the control gear set stationary in order to provide torque reaction for this set when reverse drive is established as described more fully below. While a band brake is illustrated for holding the planet carrier 23, it will be apparent that a number of other holding devices could be employed such, for example, as a multiple disc friction type clutch hydraulically or pneumatically energized or an electrically energized friction device all of which may be rendered effective to secure the planet carrier 23 to the casing 13.

The drum 26 also houses a fluid operated friction type clutch 28 which functions to connect the planet carrier 23 to the input shaft 11 in order to lock up the gear sets 16 and 17 and provide a direct forward drive from the input shaft to the output shaft. Although a fluid operated clutch is shown it should be understood that a pneumatically operated or an electrically energized clutch could be employed, if desired. As illustrated, the clutch 28 includes a plurality of clutch discs 29 secured in spaced apart relationship to the inner side of the drum 26 and interleaved with a group of clutch discs 30. The discs 30 are supported upon an outer sleeve portion 31 of an annular clutch ring 32 having an inner sleeve 33 splined to the input shaft 11 as indicated at 34. The clutch ring 32 is completed by a face plate 32a connected between the outer and inner sleeve portions 31 and 33 and extending alongside the portion 25 of the planet carrier 23. The interleaved clutch discs 29 and 30 are disposed between an annular clutch block 35 secured to the inner side of the drum 26 and a fluid operated annular piston 36 slidably mounted within a piston chamber 37 defined by a housing member 38 secured to the drum 26. The housing member 38 is retained within the drum by means of a snap ring 39 seating against its outer face. A tapered front wall 40 on the housing member is spaced slightly from the piston 36 in order to define a chamber for receiving fluid supplied from a suitable source through one or more openings 41 in a supply ring 42 and through one or more openings 43 in an inner annular wall 44 of the housing member 38. When fluid is admitted to chamber 37 at the left hand side of the piston 36 as viewed in Figs. 1 and 2, the piston is moved to the right to force the interleaved plates 29 and 30 into engagement and to compress a coil spring 45 interposed between the piston 36 and a spring retaining ring 46 carried on the wall 44. A snap ring 47 holds the retaining ring 46 in position so that the spring 45 is compressed by the movement of the piston 36 to the right. The spring 45, of course, functions to return the piston 36 to the position shown in Fig. 1 at the left of chamber 37 when the fluid pressure in the latter chamber is relieved.

The drive gear set 17 comprises, in addition to the sun gear 20 referred to above, a plurality of equally spaced planet pinions 50 meshing with the sun gear 20 and with a ring gear 51. A drive block 52 splined to the ring gear 51 as indicated at 53 transmits the drive to the output shaft 12 via a spline connection identified by the reference numeral 54. The planet pinions 50 are supported for rotation upon a planet carrier 55 which is similar to the planet carrier 23 described above. Thus, the planet carrier 55 comprises interconnected portions 56 and 57 disposed on opposite sides of the planet pinions 50 and provided with aligned openings 58 and 59, respectively, for accommodating the opposed ends of a plurality of stub shafts 60 respectively supporting the planet pinions. The carrier portion 57 is splined to the ring gear 24 as indicated by reference numeral 61 and, as a result, the ring gear of the control gear set 16 and the planet carrier 55 of the drive gear set are connected together for joint rotation.

The band brake 27 and the fluid operated clutch 28 function to control the drive through the gearing 10 and may be operated by selectively supplying fluid under pressure from a suitable control system not shown. This control system may be of any construction well known in the art and may be operated either automatically or manually. Fluid from the control system provides lubrication for the movable parts of the gearing 10 in a manner which will be well understood by those skilled in this art.

Forward drive from the input shaft 11 to the output shaft 12 is effected by actuation of the clutch 28 by supplying fluid under pressure through openings 41 and 43 to the left hand end of the chamber 37 as viewed in Fig. 1. As indicated above, delivery of pressure fluid to chamber 37 moves the piston 36 to the right to compress spring 45 and force the interleaved clutch discs 29 and 30 into frictional engagement. With the discs 29 and 30 engaged, the planet carrier 23 of the control gear set 16 is connected to the input shaft 11 which is, in effect, the sun gear 19 of the control set. With two elements of the control gear set rigidly connected together by the clutch 28, this gear set is locked up so that its gear elements rotate as a unit. The drive gear set 17 is also locked up since two of its elements, namely the sun gear 20 and the planet carrier 55, are effectively connected together. Specifically, the planet carrier 55 is joined to the ring gear 24 and the sun gear 20 is joined to the sun gear 19 and, since the gears 19 and 24 are locked together for joint rotation, it will be evident that the drive gear set 17 is locked to rotate as a unit. Thus, with the clutch 28 actuated a direct forward drive having unity speed and torque ratio is established from the input shaft 11 to the output shaft 12. While direct drive has been described as being provided by connecting the planet carrier 23 to the sun gear 19, it will be understood that such a drive can be obtained by connecting together any two of the gear elements in either of the gear sets.

Reverse drive from the input shaft to the output shaft is obtained by releasing the clutch 28 and actuating the band brake 27. Clutch 28 is released by relieving the fluid pressure in chamber 37 so that the coil spring 45 is free to return the piston 36 to the left end of the chamber 37 as viewed in Fig. 1, thereby releasing the clutch discs 29 and 30 and permitting movement between the planet carrier 23 and the input shaft 11. When band brake 27 is applied it grips the brake drum 26 and holds the planet carrier 23 against rotation, thus providing torque reaction for the control gear set 16. The drive then passes to the drive gear set 17 over two paths, the first of such paths being through the sun gear 20 which is driven in a forward direction at unity speed, that is, at the same speed as the input shaft 11. The second path of power flow to the drive gear set 17 is through the sun gear 19, pinions 21 and ring gear 24 of the control gear set and then to the planet carrier 55. The ring gear 24 is driven in a reverse direction at reduced speed and this is, of course, also true of the planet carrier 55. The ring gear 51 and the output shaft 12 are, therefore, turned in a reverse direction and at a speed which is less than unity.

In accordance with a very important feature of the present invention, the gear elements of the two gear sets 16 and 17 are constructed and designed to provide a speed ratio in reverse which is nearly unity for the reasons developed in the introductory portion of this specification. To this end, the sun gears 19 and 20 are each provided with 30 teeth, the planet pinions 21 and 50 are each formed with 27 teeth and the ring gears 24 and 51 are each constructed with 84 teeth. With this gear arrangement, in reverse drive the pinions 21 turn in reverse direction at a speed which is 1.110 times that of the input shaft 11, the ring gear 24 and planet carrier 55 turn in reverse direction at a speed which is 0.357 times that of the input shaft, pinions 50 turn in the reverse direction at a speed which is 1.506 times that of the input shaft and ring gear 51 turns in reverse direction at a speed which is 0.841 times that of the input shaft. Thus, under reverse drive conditions the ratio of input speed to output speed is 1.19 to 1 compared with a 1.00 to 1 ratio in forward drive. It will, therefore, be observed that the reverse ratio approaches unity. In addition, it will be observed that the relative speeds between the friction elements 29 and 30 and their associated housing members never exceeds unity when the gear set is in reverse.

When the gear set is conditioned for forward speed by actuating clutch 28, the planet carrier 23 and its integral drum 26, which is the element locked to establish reverse drive, turns at unity speed. Thus, undesirable high spinning ratios are avoided by the gear set of the present invention.

In view of the foregoing description it will be apparent that the enumerated objects of the invention have been accomplished by the gearing described which is effective to provide both forward and reverse drives of substantially unity ratio. Due to these ratios, the gearing may be turned end for end without changing the drive to any great extent, that is, the shaft 11 may be employed either to supply input drive to the gear set as described above or as an output element with the shaft 12 being driven. Moreover, due to the duplication of such parts as the pinions 21 and 50 and the ring gears 24 and 51, the transmission described can be manufactured relatively inexpensively and can be compactly arranged to permit easy installation and repair.

While a particular embodiment of the invention has been shown and described, it will be understood that many modifications will readily occur to those skilled in this art and it is, therefore, intended by the appended claims to cover any modifications which fall within the true spirit and scope of the invention.

What is claimed as new and is desired to be secured by Letters Patent of the United States is:

1. In a transmission the combination of an input member, an output member, a planetary gearing comprising a pair of simple planetary gear sets connected between said members, one of said sets serving as a drive set and the other of said sets serving as a control set, each of said gear sets consisting of a sun gear, a ring gear and at least one planet pinion meshing with both of the other said gears and supported upon a planet carrier, the sun gears of both of said sets being drivingly connected to one of said members for rotation therewith, means drivingly connecting the ring gear of the drive set with one of said members, means rigidly connecting the ring gear of the control set with the planet carrier of the drive set, and a pair of selectively operable control elements operably associated with the planet carrier of the control set, one of said control elements being operable to lock the planet carrier of said control set to one of said members whereby the other of said members will be driven in one direction, and the other of said control elements being operable to hold the planet carrier of said control set stationary in order to produce a dual path of power flow through said drive set whereby the other of said members will be driven by said one member in a direction opposite to said one direction.

2. The transmission of claim 1 wherein the two planetary gear sets comprise sun gears having an equal number of teeth, ring gears having an equal number of teeth and planet pinions having an equal number of teeth, whereby the relative drive ratios of said members is substantially equal in either direction of rotation.

3. The transmission of claim 1 wherein the planet carrier of said control set is provided with an axially extending annular flange, and wherein one of the said control elements cooperates with the radially inner surface of said flange and the other of said control elements cooperates with the radially outer surface of said flange.

References Cited in the file of this patent

UNITED STATES PATENTS

| | | |
|---|---|---|
| 2,288,206 | Pierpont | June 30, 1942 |
| 2,488,756 | Baker | Nov. 22, 1949 |
| 2,842,273 | Granryd | July 8, 1958 |

FOREIGN PATENTS

| | | |
|---|---|---|
| 141,492 | Great Britain | Apr. 22, 1920 |